(12) United States Patent
Bredemeier et al.

(10) Patent No.: US 11,136,106 B2
(45) Date of Patent: Oct. 5, 2021

(54) SYSTEM FOR DETECTING AN OVERPRESSURE IN THE INTERIOR OF AN AIRCRAFT

(71) Applicant: Airbus Operations GmbH, Hamburg (DE)

(72) Inventors: Kai Bredemeier, Weyhe (DE); Thorsten Knijnenburg, Bremen (DE); Matias Mail, Syke (DE)

(73) Assignee: Airbus Operations GmbH, Hamburg (DE)

( * ) Notice: Subject to any disclaimer, the term of this patent is extended or adjusted under 35 U.S.C. 154(b) by 483 days.

(21) Appl. No.: 16/100,580

(22) Filed: Aug. 10, 2018

(65) Prior Publication Data

US 2019/0054995 A1 Feb. 21, 2019

(30) Foreign Application Priority Data

Aug. 11, 2017 (DE) ..................... 10 2017 118 374.4

(51) Int. Cl.
*B64C 1/14* (2006.01)
*G08B 7/06* (2006.01)
(Continued)

(52) U.S. Cl.
CPC .............. *B64C 1/1461* (2013.01); *B64C 1/14* (2013.01); *B64D 13/02* (2013.01); *G08B 7/06* (2013.01); *B64D 2013/0603* (2013.01)

(58) Field of Classification Search
CPC ......... B64C 1/14; B64C 1/1461; B64D 13/02; B64D 2013/0603; G08B 7/06
See application file for complete search history.

(56) References Cited

U.S. PATENT DOCUMENTS

| 2008/0092630 | A1* | 4/2008 | Piorkowski | G01N 7/00 73/31.04 |
| 2008/0164373 | A1* | 7/2008 | Roming | B64C 1/14 244/129.5 |
| 2016/0325816 | A1* | 11/2016 | Scimone | B64C 1/14 |

FOREIGN PATENT DOCUMENTS

| DE | 102005002544 A1 * | 7/2006 | ............ B64D 13/04 |
| DE | 10 2015 111 5698 A1 | 1/2017 | |

(Continued)

OTHER PUBLICATIONS

Google translation of DE-102015111568, Jan. 2017.*
German Search Report for German Application No. 10 2017 118 374.4 dated Feb. 9, 2018.

*Primary Examiner* — Assres H Woldemaryam
*Assistant Examiner* — Aaron M Rodziwicz
(74) *Attorney, Agent, or Firm* — Jenkins, Wilson, Taylor & Hunt, P.A.

(57) ABSTRACT

A system for detecting overpressure in an aircraft including a door with a door frame and a door leaf with a first and second door leaf face. The door is mountable in an aircraft where the first door leaf face faces the interior and the second door leaf face faces the surroundings of the aircraft. The door leaf is movably attached to the door frame and selectively movable between an opened position where a door opening defined by the door frame is accessible and a closed position where the door leaf closes off the door opening. The door has a pair of contact faces including a first contact face on the door leaf and a second contact face on the door frame. In the closed position, the first contact face bears on the second contact face such that, when a compressive force is applied to the first door leaf face in the direction of the second door leaf face, movement of the door leaf is counteracted and contact force between the first contact face (Continued)

and the second contact face of each pair increases as the compressive force increases.

12 Claims, 2 Drawing Sheets

(51) Int. Cl.
*B64D 13/02* (2006.01)
*B64D 13/06* (2006.01)

(56) References Cited

FOREIGN PATENT DOCUMENTS

| DE | 102015111568 A1 | * | 1/2017 | ............... E05F 15/40 |
|----|-----------------|---|--------|----------------------------|
| GB | 2425638 A | * | 11/2006 | ............ B64C 1/1423 |

* cited by examiner

SYSTEM FOR DETECTING AN OVERPRESSURE IN THE INTERIOR OF AN AIRCRAFT

CROSS-REFERENCE TO RELATED APPLICATION

This application claims priority to German Patent Application DE 10 2017 118 374.4 filed Aug. 11, 2017, the entire disclosure of which is incorporated by reference herein.

TECHNICAL FIELD

The disclosure herein relates to a system for detecting an overpressure in the interior of an aircraft with respect to the surroundings of the aircraft.

BACKGROUND

In most aircraft, and in particular in passenger aircraft, the interior of the aircraft fuselage and, in particular, the cabin are subjected to an overpressure during flight in order to keep the pressure in the cabin at a pressure which corresponds to a low altitude, at which even at a cruising altitude of e.g. 10000 meters it is improbable that the human body will notice a deviation from atmospheric pressure at sea level.

For this purpose, the aircraft is typically equipped with a device which during operation continuously pumps air from the surroundings of the aircraft into the fuselage and the cabin and with one or more outflow valves for continuously discharging air from the interior of the fuselage and the cabin. The ratio of the flow of air into the cabin to the flow of air out of the cabin is set either manually or automatically in order as a result to reach and maintain the desired pressure in the cabin. If automatic control of the outflow valves is provided, it is implemented using a cabin pressure control system which activates the outflow valves and typically also controls the air flow into the cabin. Even in the case of such automated systems there is usually the possibility of controlling the outflow valves manually in the event of a malfunction of the automatic control.

If a cabin pressure control system is present, the altitude of the destination airport is input into the cabin pressure control system before the initiation of a landing process of the aircraft, and the outflow valves are gradually opened during the descent in such a way that when touchdown occurs the cabin pressure is equal to the atmospheric pressure on the ground at the destination airport. If the cabin pressure control system is working and being operated correctly, it also serves to prevent the occurrence of a persistent overpressure of the interior of the cabin with respect to the surroundings of the aircraft after the landing at a time when the aircraft doors are to be opened. This is highly significant because if an overpressure with respect to the surroundings of the aircraft is present the aircraft door can open explosively, entailing the risk of persons operating the door, or other persons, being injured and of the aircraft or devices located in the vicinity being damaged.

In order to prevent such situations, passenger aircraft are typically equipped with a device for measuring the cabin pressure and for displaying the cabin pressure or for outputting a warning when a potentially dangerous persistent overpressure in the interior of the cabin with respect to the surroundings of the aircraft, such as for example an overpressure of more than 2.5 mbar, occurs. Such display or warning systems can be integrated, in particular, into the doors and can be provided with an autonomous power supply and an autonomous control device in order to ensure that they operate even if the aircraft systems have been switched off after reaching the parked position and the electric on-board power system is therefore partially or completely switched off. The warning can be provided in the form of an acoustic and/or optical alarm at or in the vicinity of the door. If a warning is output or a state of overpressure is displayed, the crew of the aircraft can simply wait or can manually open (further) the outflow valves or a special valve in order to bring about a rapid equalization of pressure.

It is to be noted that a persistent overpressure in the interior of the cabin with respect to the surroundings of the aircraft can occur even when the cabin pressure control system is in principle operating correctly. For example, the pilot could enter an incorrect altitude of the destination airport, the interior of the cabin could heat up in the parked state of the aircraft as a result of solar radiation, or a manual device could be operated incorrectly.

Conventional displays or warning apparatuses for a persistent cabin overpressure have a mechanical differential pressure sensor which is arranged in a line system or pipe system of another aircraft system which uses the line system or pipe system and is adapted or configured to detect and determine data which are critical for flight, for example altitude and speed. This line system or pipe system has one or more external pressure connections which are arranged in the fuselage of the aircraft. Even though, in contrast to the system for detecting and determining data which are critical for flight, it is only necessary to detect a persistent cabin overpressure if the aircraft is on the ground, the differential pressure sensor therefore has to satisfy very stringent requirements which are determined by the requirements which have to be satisfied by the system which is critical for flight. This also relates to the maintenance of the differential pressure sensor and to the cabin overpressure display apparatus or cabin overpressure warning apparatus which makes use of the differential pressure sensor.

Furthermore, the differential pressure sensor must be able to withstand differential pressures which at cruising altitude can reach up to 700 mbar or more, so that many commercially available and cost-effective differential pressure sensors cannot be used, or cannot be readily used.

SUMMARY

An object of the disclosure herein is therefore to make available a system with which the occurrence of overpressure in the interior of an aircraft with respect to the surroundings of the aircraft can be detected reliably, and which is simple in design and cost-effective to operate. This object is achieved by a system and an aircraft having features disclosed herein.

According to the disclosure herein, a system for detecting an overpressure in the interior of an aircraft with respect to the surroundings of the aircraft is provided, i.e. for detecting a cabin overpressure or persistent cabin overpressure. The system has a door with a door frame and a door leaf. The door leaf can have, for the purpose of reinforcement, for example paneling, for example in the form of a plurality of beams which are spaced apart from one another and extend over the width of the door leaf. In any case, the door leaf has a first door leaf face and a second door leaf face located opposite, which door leaf faces constitute the two broad extended faces of the door leaf. The door is adapted or configured to be mounted in an aircraft or the fuselage thereof in such a way that in the closed position the first door leaf face faces the interior of a cabin of the aircraft and is therefore subjected to the internal pressure of the cabin and the second door leaf face faces the surroundings of the aircraft is therefore subjected to the ambient pressure. The door leaf is movably attached to the door frame in such a way that the door leaf can be moved selectively between an opened position in which a door opening which is defined by the door frame is accessible and a closed position in which the door leaf closes off the door opening.

The door also has one or more pairs of contact faces which are assigned to one another. Each of these pairs has in each case a first contact face on the door leaf and a second contact face on the door frame, or the first contact face is assigned to the door leaf and the second contact face is assigned to the door frame. The first and second contact faces of each of the pairs are arranged in each case in such a way that in the closed position of the door leaf the first contact face bears on the second contact face—preferably in a positively locking fashion—in such a way that, when a compressive force is applied to the first door leaf face in the direction of the second door leaf face, as a result of the contact, a movement of the door leaf in the direction of the compressive force is counteracted and the contact force between the first contact face and the second contact face of each pair increases as the compressive force increases. In other words, the contact faces bear one against the other in the direction of the pressure loading direction brought about by the compressive force. Such a compressive force is applied if in the installed state of the door in the interior of the aircraft an overpressure with respect to the surroundings of the aircraft is present, and it generally acts perpendicularly or essentially perpendicularly on the first door leaf face.

The movement of the door leaf between the open and the closed position can preferably be carried out by a predefined opening and closing movement, which is defined by the attachment between the door leaf and the door frame which can comprise, e.g. a hinge and a device, in order to move the door leaf upward and downward in the plane of the door leaf or along a curvature of the door leaf. The door leaf is preferably opened outward, wherein there can be provision that when the door opens the door leaf initially has to be moved inward by a certain amount in order to move the contact faces apart from one another.

In any case, the system also has one or more force sensors or force transducers. In this context, one of these force sensors is provided for each pair of contact faces and is arranged and configured to measure the contact force between the first contact face and the second contact face of the respective pair, in order to generate a sensor signal which is dependent on the contact force.

The system has an advantage that it is completely independent of systems which are critical for flight, so that relatively low requirements have to be satisfied by the system in general and by the force sensors in particular. For example, leakage rate requirements play no role for the system because of the arrangement outside connecting lines or connecting paths between the interior of the aircraft and the surroundings and because of the separate door seals which are always present. In addition, suitable force sensors are of simple design, are robust and can also be used at high differential pressures. Therefore, the system is cost-effective and simple to install and service, and it is very easy to retrofit existing aircraft with the system by simply closing off the line with the existing differential pressure sensor and mounting force sensors at suitable locations on the door frame and/or the door leaf.

In a preferred embodiment, for each pair the first contact face is provided on a—preferably different—corresponding first projection of the door leaf, which first projection extends in the direction of the door frame in the closed position of the door leaf, and/or for each pair the second contact face is provided on a, preferably different, corresponding second projection of the door frame, which second projection extends in the direction of the door leaf in the closed position of the door leaf. It is particularly advantageous here if the first projection and/or the second projection are/is in each case a door stop which door stops are as a rule provided on aircraft doors independently of the disclosure herein, in order to prevent opening as a result of an overpressure in the interior of the cabin when the door is closed. For this purpose, the door stops engage one in the other in the closed position. It is possible to provide a force sensor for each pair of interacting door stops of the door or else only for some pairs of interacting door stops. It is particularly easy to arrange and attach force sensors for measuring the contact force between interacting door stops. However, it is also possible to arrange the force sensors at other locations on the door leaf or door frame.

In a preferred embodiment, one or more of the force sensors have the first contact face or the second contact face of the assigned pair of contact faces. In other words, the first contact face or the second contact face is then made available by the corresponding force sensor. If the abovementioned first and/or second projections are present, the force sensor can be provided, for example, as part of the first or second projection and can have or be, for example, in each case a separates element which is arranged at least partially between a section of the first projection or second projection and the second projection or first projection.

In a preferred embodiment which can be combined with the preceding embodiment, one or more of the force sensors are arranged in such a way that a contact force acting on the first contact face or the second contact face of the respectively assigned pair of contact faces is transmitted to the force sensor. If the abovementioned first and/or second projections are present, the force sensor can, for example, be integrated into the first or second projection, and the contact face can be provided on a separate element which is coupled to the force sensor.

The at least one force sensor can, for example, preferably be in each case a force measurement bolt, a force measurement plate, a spring body force transducer, a piezo-electric force transducer or a resistive force transducer.

In a preferred embodiment, the system also has a first control device which is connected, in a wire-bound or wireless fashion, to the one or more force sensors and is adapted or configured to process the sensor signals thereof and to generate, on the basis of the sensor signals of the one or more force sensors, an output signal which depends on the sensor signals of the one or more force sensors. The generation can preferably take place in such a way that the output signal corresponds to the output signal of a conventional differential pressure sensor so that conventional differential pressure warning devices or differential pressure display devices can be used without adaptation. Furthermore, it is possible for the first control device to have two or more separate first control devices, which are, for example, connected to one another and which cooperate successively or in parallel in the conversion of the sensor signal or the sensor signals into the output signal. The first control device can also supply power, in a wire-bound or wireless fashion, for example a supply voltage, to the one or more force sensors in order to operate them. Furthermore it is possible for the first control device to be integrated into each of the force sensors, so that the force sensors immediately output the output signal. It is therefore possible in this way e.g. that the force sensors directly generate the output signal in such a way that it indicates whether the pressure acting on the first door leaf face is higher than the pressure acting on the second door leaf face by more than the predetermined limiting value. This has an advantage that existing systems which are based on differential pressure switches can be replaced without the interface to the other aircraft systems, such as for example a power supply device and, in particular, an autonomous standby power supply unit (ASPSU) of the aircraft having to be modified. The predetermined limiting value can be, for example, 2 to 3 mbar, preferably 2.3 to 2.7 mbar, more preferably 2.4 to 2.6 mbar, and most preferably approximately 2.5 mbar.

In the embodiment in which the system has a first control device, the first control device is preferably adapted or configured to determine, on the basis of the sensor signal or sensor signals of the one or more force sensors, whether a pressure acting on the first door leaf face is higher than a pressure acting on the second door leaf face by more than a predetermined limiting value, and to generate the output signal in such a way that it indicates whether the pressure acting on the first door leaf face is higher than the pressure acting on the second door leaf face by more than the predetermined limiting value. The predetermining limiting value can be, for example, again 2 to 3 mbar, preferably 2.3 to 2.7 mbar, more preferably 2.4 to 2.6 mbar and most preferably approximately 2.5 mbar. The system also has an acoustic signal device and/or an optical signal device which are/is connected to the first control device and adapted or configured to receive the output signal and be activated if the output signal indicates that the pressure acting on the first door leaf face is higher than the pressure acting on the second door leaf face by more than the predetermined limiting value. The output signal can be, for example, a binary signal which in this way can be used particularly easily to switch the acoustic signal device and/or optical signal device on and off, and corresponds, for example, to the signal of a conventional differential pressure switch. The acoustic signal device and/or optical signal device can also be embodied as one unit together with the first control device.

In an alternative preferred embodiment in which the system likewise has a first control device, the system also has a second control device which is connected to the first control device, and an acoustic signal device and/or an optical signal device which are/is connected to the second control device. The second control device is adapted or configured to determine, on the basis of the output signal, whether a pressure acting on the first door leaf face is higher than a pressure acting on the second door leaf face by more than a predetermined limiting value, and to generate the control signal in such a way that it indicates whether the pressure acting on the first door leaf face is higher than the pressure acting on the second door leaf face by more than the predetermined limiting value. The predetermined limiting value can be, again, for example, 2 to 3 mbar, preferably 2.3 to 2.7 mbar, more preferably 2.4 to 2.6 mbar and most preferably approximately 2.5 mbar. The second control device can be, for example, an autonomous standby power supply unit (ASPSU) or can be contained in such a unit. The acoustic signal device and/or the optical signal device are/is adapted or configured to receive the control signal and be activated if the control signal indicates that the pressure acting on the first door leaf face is higher than the pressure acting on the second door leaf face by more than the predetermined limiting value. The output signal can be, for example, again a binary signal which in this way can be used particularly easily to switch the acoustic signal device and/or optical signal device on and off. The acoustic signal device and/or optical signal device can also be embodied as one unit together with the second control device.

In embodiments in which a first control device is provided, the latter is preferably adapted or configured to determine whether the aircraft is on the ground and to evaluate the sensor signal of the at least one force sensor only if the aircraft is on the ground. Alternatively or additionally, in embodiments in which a second control device is provided, the latter is preferably adapted or configured to determine whether the aircraft is on the ground and to evaluate the output signal only if the aircraft is on the ground. In both cases, the determination as to whether the aircraft is on the ground can take place, for example, on the basis of the reception of an external suitable sensor signal. For this purpose, the aircraft in general and the system in particular can advantageously have a sensor which is functionally connected to the first or second control device and is adapted or configured to detect the occurrence of one or more predetermined events which are characteristic of landing of the aircraft having taken place, such as for example the touching down of the aircraft or the stopping of the aircraft, and to generate a corresponding detection signal. It is also conceivable for the force sensors themselves to be adapted or configured to determine in the same way as has been described above whether the aircraft is on the ground, and to supply sensor signals only when it has been detected that the aircraft is on the ground.

In a preferred embodiment, the system also has an interface for receiving, in a wire-bound or wireless fashion, power from an external power supply device. The external power supply device can be, for example, an electrical power source which is part of the normal electrical power supply system of an aircraft or an ASPSU of the aircraft, e.g. an ASPSU which is provided in the aircraft for supplying power to the differential pressure sensor which is replaced by the force sensors according to the disclosure herein. Alternatively or additionally, the system has a dedicated independent power supply device, preferably a battery which cannot be recharged or preferably a rechargeable battery. A dedicated power supply device has an advantage that, at least for a certain period of time, an overpressure can be detected even in cases in which the aircraft is parked and switched off. It is also possible to provide a device which is adapted or configured to acquire power independently from the operation of the system or the door, for example from the forces or changes in force, pressures or changes in pressure, temperatures or changes in temperature, etc. which occur during operation.

In a preferred embodiment, the system described above is part of an aircraft having a fuselage which defines a cabin. The door is mounted in the aircraft in such a way that in the closed position the first door leaf face faces the interior of the cabin of the aircraft and the second door leaf face faces the surroundings of the aircraft. The door can be a freight door or a freight gate, but is preferably a passenger door.

BRIEF DESCRIPTION OF THE DRAWINGS

The disclosure herein will be described in more detail below on the basis of an exemplary embodiment and with reference to the drawings.

DETAILED DESCRIPTION

Figure 1:
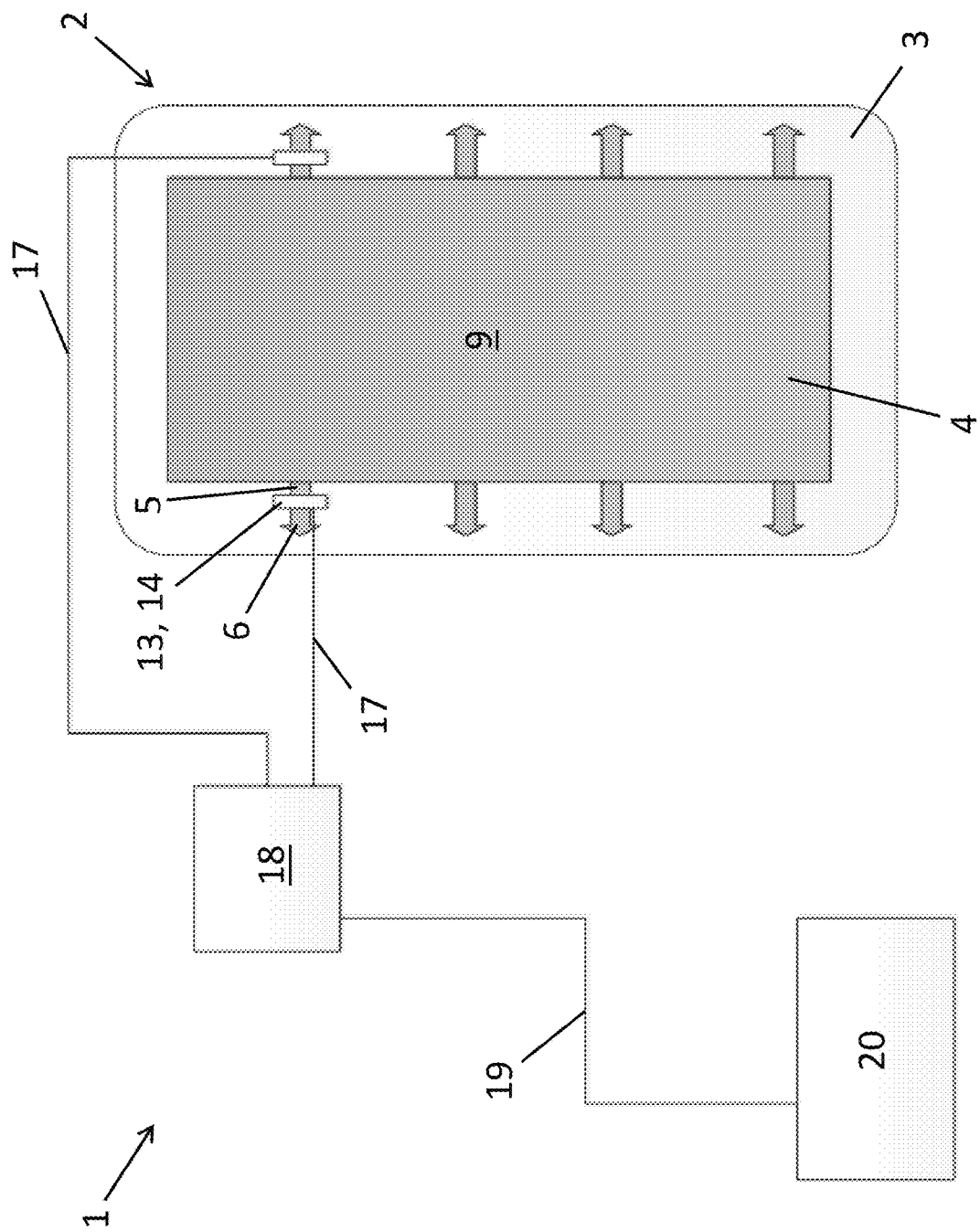
FIG. 1 shows a schematic view of a system according to an embodiment of the disclosure herein.

The system 1, shown in FIG. 1, for detecting an overpressure in the interior of an aircraft with respect to the surroundings of the aircraft has an aircraft door 2, which in turn has a door frame 3 and a door leaf 4. The door leaf 4 is attached, for example using a hinge device, to the door frame 3 in such a way that it can be moved between the closed position shown in FIGS. 1 and 2, in which a door opening which is provided in the door frame 3 is closed off by the door leaf 4, and an opened position in which the door opening is cleared. FIG. 1 shows a view of the inside of the aircraft door 2, i.e. of the side of the door leaf 4 which, in the state installed in an aircraft, faces the interior of the aircraft or the cabin thereof. On the two longitudinal edges on the door leaf 4 there are provided a plurality of first stop devices or projections 5 protrude outward in the direction of the door frame 3 extend from the door leaf 4, and for each of these stop devices 5 a corresponding stop device 6 is provided on the door frame 3, which stop devices 6 each extend from the door frame 3 in the direction of the door leaf 4.

Figure 2:
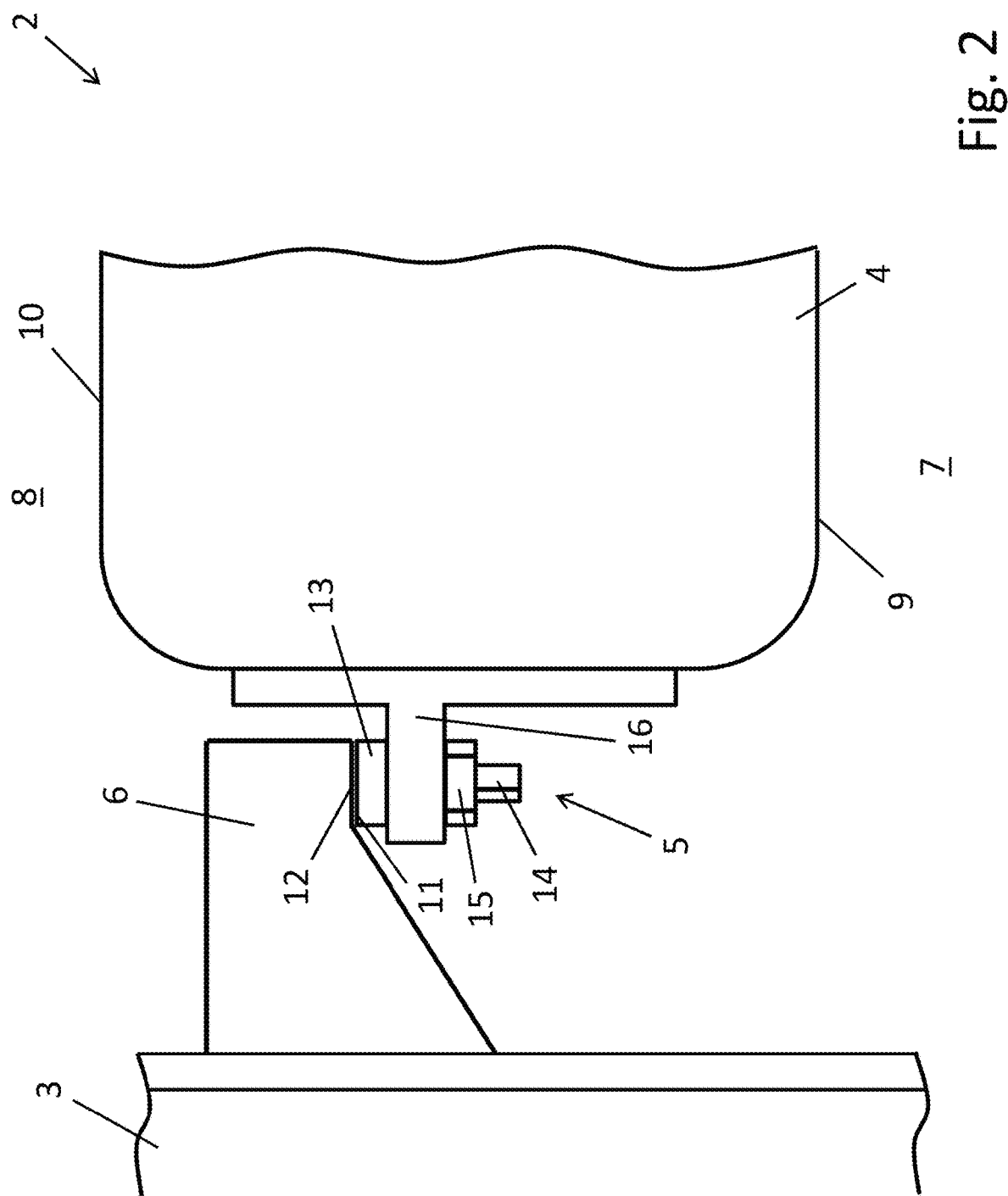
FIG. 2 shows a detailed view of two interacting door stops of the system in FIG. 1.

One of these pairs of stop devices 5 and 6 is illustrated in more detail in FIG. 2, which shows a sectional view of the door 2 and in which the interior 7 of a cabin of an aircraft, into which the door 2 is installed, is located on the lower side, in the figure, of the door leaf 4, and the surroundings 8 of the aircraft are located on the upper side of the door leaf 4. The lower side of the door leaf 4 forms an inner face 9 of the door leaf 4, and the upper side forms an outer face 10 of the door leaf 4.

The first stop device 5 has a first stop face or contact face 11, and the second stop device 6 has a second stop face or contact face 12, wherein in the illustrated closed position the stop faces 11, 12 bear against one another. The stop face 12 is provided on the stop device 6 and is formed by a section of the surface thereof. The stop face 11 is provided on the stop device 5 and is also formed by a section of the surface thereof. In this context, the stop device 5 has a plate-shaped or disk-shaped section or a plate-shaped or disk-shaped id element 13 which is attached to a main section 16 of the stop device 5 using a bolt 14 and a nut 5. The section or the element 13 or the bolt 14 is embodied as a force measurement plate or as a force measurement bolt and configured to measure the contact force between the two contact faces 11 and 12 in the axial direction of the bolt 14, and to generate a sensor signal which is dependent on the contact force or representative thereof.

The bearing of the contact faces 11 and 12 against one another counteracts a movement of the door leaf outward owing to a compressive force acting perpendicularly on the inner face 9 of the door leaf 4 (i.e. perpendicularly from bottom to top in FIG. 2), which compressive force is produced by an overpressure in the interior 7 of the aircraft with respect to the surroundings 8. As the overpressure increases, the contact force also becomes greater, with the result that the contact force is characteristic of the overpressure.

As is shown in FIG. 1, the sensor signals of the individual force sensors 13 and 14 are conducted via lines 17 to a first control device 18 which simultaneously supplies power to the force sensors 13 and 14 via the lines 17 for the operation of the force sensors 13 and 14. The first control device 18 is adapted or configured to convert the sensor signals into an output signal which is output via the line 19, via which the first control device 18 is connected to a second control device 20. The output signal indicates whether the overpressure in the interior 7 exceeds a predetermined limiting value of, for example, 2.5 mbar compared to the exterior 8. The second control device 20 comprises a signal device which is activated by the second control device if the output signal indicates that the limiting value is exceeded. In every case the limiting value is selected such that when an aircraft is on the ground the limiting value corresponds to an overpressure starting from which opening of the door 2 is not possible without risk.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for detecting an overpressure in an interior of an aircraft with respect to surroundings of the aircraft, the system comprising:
   a door comprising:
     a door frame; and
     a door leaf, which has a first door leaf face and a second door leaf face, located opposite each other;
     wherein the door is mountable in an aircraft, such that the first door leaf face faces an interior of a cabin of the aircraft and the second door leaf face faces the surroundings of the aircraft;
     wherein the door leaf is movably attached to the door frame, such that the door leaf is selectively movable between an opened position, in which a door opening defined by the door frame is accessible, and a closed position, in which the door leaf closes off the door opening; and wherein the door has at least one or more pair of contact faces, which are assigned to one another, each pair of contact faces comprising a first contact face on the door leaf and a second contact face on the door frame, the first and second contact faces being arranged such that, in the closed position of the door leaf, the first contact face of each pair of contact faces bears on the second contact face of the pair of contact faces such that, when a compressive force is applied to the first door leaf face in a direction of the second door leaf face, as a result of contact, a movement of the door leaf in a direction of the compressive force is counteracted and a contact force between the first contact face and the second contact face of each pair of contact faces increases as the compressive force increases; and at least one force sensor, wherein a force sensor of the at least one force sensor is provided for each pair of contact faces, the force sensor being arranged and configured to measure the contact force between the first contact face and the second contact face of the respective pair of contact faces and to generate a sensor signal dependent on the contact force.

2. The system according to claim 1, wherein:

for each pair of contact faces, the first contact face is on a corresponding first projection of the door leaf, the first projection extending in a direction of the door frame in the closed position of the door leaf; and/or for each pair of contact faces, the second contact face is on a corresponding second projection of the door frame, the second projection extending in a direction of the door leaf in the closed position of the door leaf.

3. The system according to claim 2, wherein the first projection and/or the second projection are/is a door stop.

4. The system according to claim 1, wherein at least one of the at least one force sensor has the first contact face or the second contact face of the assigned pair of contact faces.

5. The system according to claim 1, wherein at least one of the at least one force sensor is arranged such that a contact force acting on the first contact face or the second contact face of the assigned pair is transmitted to the force sensor.

6. The system according to claim 1, wherein the at least one force sensor is a force measurement bolt, a force measurement plate, a spring body force transducer, a piezoelectric force transducer, or a resistive force transducer.

7. The system according to claim 1, further comprising a first control device connected to the at least one force sensor, wherein the first control device is configured to process the sensor signal of the at least one force sensor and to generate, based on the sensor signal of the at least one force sensor, an output signal which depends on the sensor signal of the at least one force sensor.

8. The system according to claim 7, wherein the first control device is configured to:

determine, based on the sensor signal of the at least one force sensor, whether a pressure acting on the first door leaf face is higher than a pressure acting on the second door leaf face by more than a predetermined limiting value, and generate the output signal to indicate whether the pressure acting on the first door leaf face is higher than the pressure acting on the second door leaf face by more than the predetermined limiting value;

the system comprising an acoustic signal device and/or an optical signal device connected to the first control device and configured to receive the output signal and for activation when the output signal indicates that the pressure acting on the first door leaf face is higher than the pressure acting on the second door leaf face by more than the predetermined limiting value.

9. The system according to claim 7, further comprising:

a second control device connected to the first control device; and an acoustic signal device and/or an optical signal device connected to the second control device;

wherein the second control device is configured to:

determine, based on the output signal, whether a pressure acting on the first door leaf face is higher than a pressure acting on the second door leaf face by more than a predetermined limiting value, and generate the control signal to indicate whether the pressure acting on the first door leaf face is higher than the pressure acting on the second door leaf face by more than the predetermined limiting value; and wherein the acoustic signal device and/or the optical signal device are/is configured to receive the control signal and for activation when the control signal indicates that the pressure acting on the first door leaf face is higher than the pressure acting on the second door leaf face by more than the predetermined limiting value.

10. The system according to claim 9, wherein the first control device is configured to determine whether the aircraft is on ground and to evaluate the sensor signal of the at least one force sensor only when the aircraft is on the ground, or wherein the second control device is configured to determine whether the aircraft is on the ground and to evaluate the output signal only when the aircraft is on the ground.

11. The system according to claim 1, further comprising an interface for receiving power from an external power supply device or a dedicated independent power supply device.

12. An aircraft comprising:

a fuselage, which defines a cabin; and a system for detecting an overpressure in an interior of the aircraft with respect to surroundings of the aircraft, the system comprising:

a door comprising:

a door frame; and a door leaf, which has a first door leaf face and a second door leaf face, located opposite each other;

wherein the door is mountable in an aircraft, such that the first door leaf face faces the interior of the aircraft and the second door leaf face faces the surroundings of the aircraft;

wherein the door leaf is movably attached to the door frame, such that the door leaf is selectively movable between an opened position, in which a door opening which is defined by the door frame is accessible, and a closed position, in which the door leaf closes off the door opening; and wherein the door has at least one or more pair of contact faces; which are assigned to one another, each pair of contact faces comprising a first contact face on the door leaf and a second contact face on the door frame, the first and second contact faces being arranged such that, in the closed position of the door leaf, the first contact face of each pair of contact faces bears on the second contact face of the pair of contact faces such that, when a compressive force is applied to the first door leaf face in a direction of the second door leaf face, as a result of contact, a movement of the door leaf in a direction of the compressive force is counteracted and a contact force between the first contact face and the second contact face of each pair of contact faces increases as the compressive force increases; and at least one force sensor, wherein a force sensor of the at least one force sensor is provided for each pair of contact faces, the force sensor being arranged and configured to measure the contact force between the first contact face and the second contact face of the respective pair of contact faces and to generate a sensor signal dependent on the contact force;

wherein the door is mounted in the aircraft such that the first door leaf face faces the interior of the cabin of the aircraft and the second door leaf face faces the surroundings of the aircraft.

\* \* \* \* \*